(12) United States Patent
Nakayama

(10) Patent No.: US 11,040,442 B2
(45) Date of Patent: Jun. 22, 2021

(54) ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/132,607

(22) Filed: Sep. 17, 2018

(65) Prior Publication Data
US 2019/0099882 A1    Apr. 4, 2019

(30) Foreign Application Priority Data
Sep. 29, 2017  (JP) .............................. JP2017-189984

(51) Int. Cl.
| | | |
|---|---|---|
| B25J 9/08 | (2006.01) | |
| B25J 18/02 | (2006.01) | |
| B25J 9/04 | (2006.01) | |
| B25J 9/00 | (2006.01) | |
| B25J 18/04 | (2006.01) | |
| B25J 17/02 | (2006.01) | |

(52) U.S. Cl.
CPC .............. *B25J 9/08* (2013.01); *B25J 9/0024* (2013.01); *B25J 9/0027* (2013.01); *B25J 9/042* (2013.01); *B25J 9/046* (2013.01); *B25J 18/02* (2013.01); *B25J 18/04* (2013.01); *B25J 17/02* (2013.01)

(58) Field of Classification Search
CPC . B25J 9/08; B25J 9/0024; B25J 9/0027; B25J 9/042; B25J 9/046; B25J 18/02; B25J 18/04; B25J 17/02
See application file for complete search history.

(56) References Cited

U.S. PATENT DOCUMENTS

| | | | | |
|---|---|---|---|---|
| 4,505,049 A | * | 3/1985 | Kuno ..................... | B25J 9/046 33/1 PT |
| 4,537,085 A | * | 8/1985 | Valentine ............. | B25J 17/0241 74/107 |
| 4,698,482 A | * | 10/1987 | Monteith ........... | B23K 26/0884 219/121.78 |
| 4,936,052 A | * | 6/1990 | Nagase .............. | G05B 19/4062 451/152 |

(Continued)

FOREIGN PATENT DOCUMENTS

| | | |
|---|---|---|
| EP | 0 187 871 A1 | 7/1986 |
| JP | S60-135188 A | 7/1985 |

(Continued)

OTHER PUBLICATIONS

Office Action dated Jul. 30, 2019, in corresponding Japanese Application No. 2017-189984; 9 pages.

(Continued)

*Primary Examiner* — Zakaria Elahmadi

(74) *Attorney, Agent, or Firm* — Maier & Maier, PLLC

(57) ABSTRACT

A robot that includes a first shaft unit in which a first motor drives a second member relative to a first member; a second shaft unit in which a second motor drives a fourth member relative to a third member; and a securing member that is provided in a detachable manner between the second member and the third member and that integrally secures the second member and the third member to each other.

12 Claims, 19 Drawing Sheets

(56) References Cited

U.S. PATENT DOCUMENTS

| | | | | |
|---|---|---|---|---|
| 8,347,755 B2* | 1/2013 | Bennett | ............... | A61B 34/30 |
| | | | | 74/490.04 |
| 9,073,218 B2* | 7/2015 | Watanabe | ............... | B25J 17/02 |
| 10,406,680 B2* | 9/2019 | Inoue | ............... | B25J 18/04 |
| 2010/0158656 A1* | 6/2010 | Seavey | ............... | B25J 5/005 |
| | | | | 414/744.5 |
| 2011/0113917 A1* | 5/2011 | Long | ............... | B25J 9/102 |
| | | | | 74/490.03 |
| 2011/0126661 A1* | 6/2011 | Long | ............... | B25J 9/047 |
| | | | | 74/490.05 |
| 2013/0039730 A1* | 2/2013 | Sueyoshi | ............... | B25J 9/042 |
| | | | | 414/685 |
| 2014/0069335 A1 | 3/2014 | Bania et al. | | |
| 2015/0019003 A1* | 1/2015 | Murakami | ............... | B25J 17/02 |
| | | | | 700/217 |
| 2015/0190934 A1* | 7/2015 | Chiu | ............... | B25J 9/08 |
| | | | | 74/490.01 |
| 2016/0039093 A1* | 2/2016 | Abdallah | ............... | B25J 5/04 |
| | | | | 700/257 |
| 2016/0046019 A1* | 2/2016 | Ryu | ............... | F15B 15/14 |
| | | | | 74/490.05 |
| 2017/0282381 A1* | 10/2017 | Inoue | ............... | B25J 19/0025 |
| 2018/0029064 A1* | 2/2018 | Bania | ............... | B05B 16/40 |
| 2018/0050375 A1* | 2/2018 | Yogo | ............... | B25J 9/046 |
| 2018/0370025 A1* | 12/2018 | Didey | ............... | A63H 11/00 |
| 2019/0054615 A1* | 2/2019 | Ulliman | ............... | B24D 7/02 |
| 2019/0061145 A1* | 2/2019 | Ohtsubo | ............... | B25J 18/007 |
| 2019/0299426 A1* | 10/2019 | Ozog | ............... | B25J 18/02 |

FOREIGN PATENT DOCUMENTS

| | | |
|---|---|---|
| JP | S61-30396 A | 2/1986 |
| JP | S63-94691 U | 6/1988 |
| JP | H08-57791 A | 3/1996 |
| JP | 2000-308989 A | 11/2000 |
| JP | 2014-061589 A | 4/2014 |
| JP | 2014-087863 A | 5/2014 |
| JP | 2015-127090 A | 7/2015 |
| WO | 2017/150316 A1 | 9/2017 |
| WO | 2017/208870 A1 | 12/2017 |

OTHER PUBLICATIONS

Search Report dated Jul. 17, 2019, in corresponding Japanese Application No. 2017-189984; 148 pages.

* cited by examiner

ROBOT

CROSS-REFERENCE TO RELATED APPLICATIONS

This application is based on Japanese Patent Application No. 2017-189984, the content of which is incorporated herein by reference.

FIELD

The present invention relates to robots.

BACKGROUND

A known robot in the related art has a forearm that is replaceable with another one having a different length so that, when the working position of the robot is concentrated close to or far from the installed position of the robot, the operating range of the robot can be changed (for example, see Japanese Unexamined Patent Application, Publication No. Sho 61-30396).

The robot according to Patent Literature 1 is configured such that a plurality of concentric hollow tubes whose opposite ends are provided with gears for transmitting a driving force from a motor are detachable from the gears at the opposite ends so that, by replacing each hollow tube with another one having a different length, the length of the forearm can be changed.

SUMMARY

The present invention provides the following solutions.

An aspect of the present invention provides a robot including: a first shaft unit in which a first motor drives a second member relative to a first member; a second shaft unit in which a second motor drives a fourth member relative to a third member; and a securing member that is provided in a detachable manner between the second member and the third member and that integrally secures the second member and the third member to each other.

DETAILED DESCRIPTION

A robot 1 according to an embodiment of the present invention will be described below with reference to the drawings.

Figure 1:
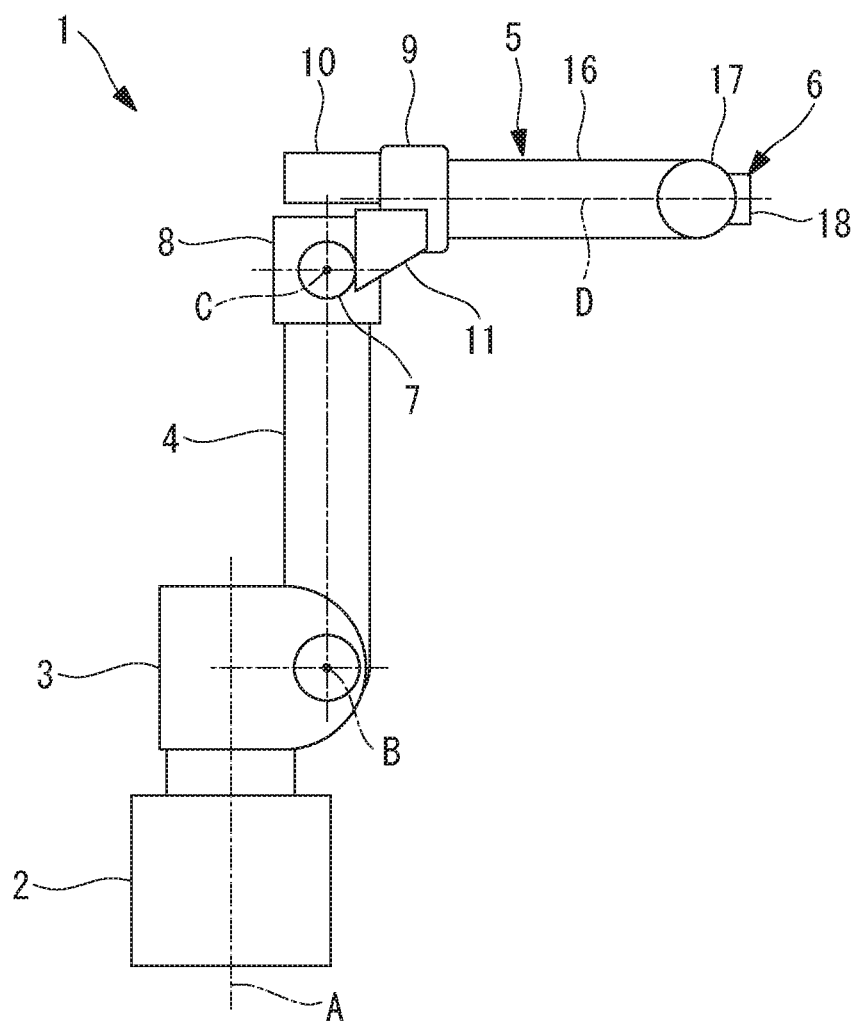
FIG. 1 is a side view schematically illustrating the overall configuration of a robot (short arm) according to an embodiment of the present invention.

As shown in FIG. 1, the robot 1 according to this embodiment is a six-axis articulated robot and includes a base to be installed on a floor surface, a rotating body 3 rotatable about a first axis A that is orthogonal to the base 2, a first arm (first member) 4 rotatable about a second axis B that is horizontal to the rotating body 3, a second arm 5 provided at the distal end of the first arm 4 and rotatable about a third axis C that is parallel to the second axis B, and a triaxial wrist (wrist section) 6 provided at the distal end of the second arm 5.

The second arm 5 includes a motor (first motor) 7 attached to the distal end of the first arm 4, a first bracket (second member) 8 rotatable by the motor 7 about the third axis C relative to the first arm 4, a second bracket (third member) 9, a motor (second motor) 10 that rotates the wrist 6 relative to the second bracket 9 about a fourth axis D extending within a plane orthogonal to the third axis C, and securing members 11 that connect the first bracket 8 and the second bracket 9 in a detachable manner.

In this embodiment, the first arm 4, the first bracket 8 attached to the first arm 4 in a swivable manner about the third axis C, and the motor 7 that rotationally drives the first bracket 8 about the third axis C constitute a first shaft unit, and the second bracket 9, the wrist 6 attached to the second bracket 9 in a rotatable manner about the fourth axis D, and the motor 10 that rotationally drives the wrist 6 about the fourth axis D constitute a second shaft unit. The first shaft unit includes a power transmission mechanism (speed reduction mechanism) that transmits the power from the first motor 7 to the first bracket 8, and the second shaft unit includes a power transmission mechanism (speed reduction mechanism) that transmits the power from the second motor 10 to the second arm 5. In the example in FIG. 1, the first arm 4 and the first bracket 8 have the power transmission mechanism disposed therebetween, and the motor 7 and the first bracket 8 rotate together about the third axis C.

The wrist 6 is constituted of a base end shaft (fourth member) 16 rotatable by the motor 10 about the fourth axis D, an intermediate shaft (fifth member) 17 rotatable relative to the base end shaft 16 about an axis extending within a plane orthogonal to the fourth axis D, and a distal end shaft (sixth member) 18 rotatable relative to the intermediate shaft 17 about an axis disposed within the same plane as the fourth axis D.

Two motors (a third motor and a fourth motor, neither of which are shown) that rotationally drive the two shafts 17 and 18, of the three shafts 16, 17, and 18 constituting the wrist 6, at the distal end and the power transmission mechanism (not shown) are disposed within the second arm 5.

Figure 6:
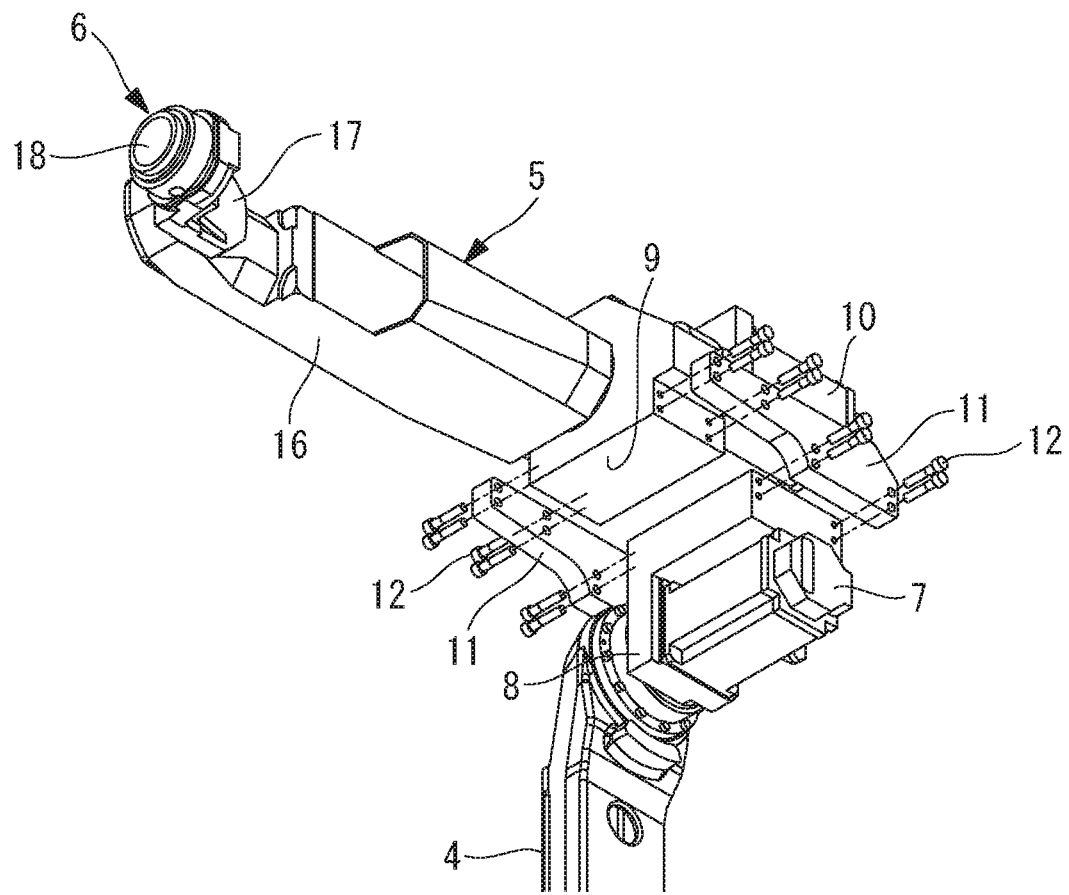
FIG. 6 is an exploded perspective view illustrating a state where bolts used for attaching securing members in FIG. 5 are removed.

In this embodiment, the securing members 11 are flat plate members disposed to sandwich the first bracket 8 and the second bracket 9 from opposite sides and are secured to the first bracket 8 and the second bracket 9 in a detachable manner by means of bolts 12 (see FIG. 6).

Figure 2:
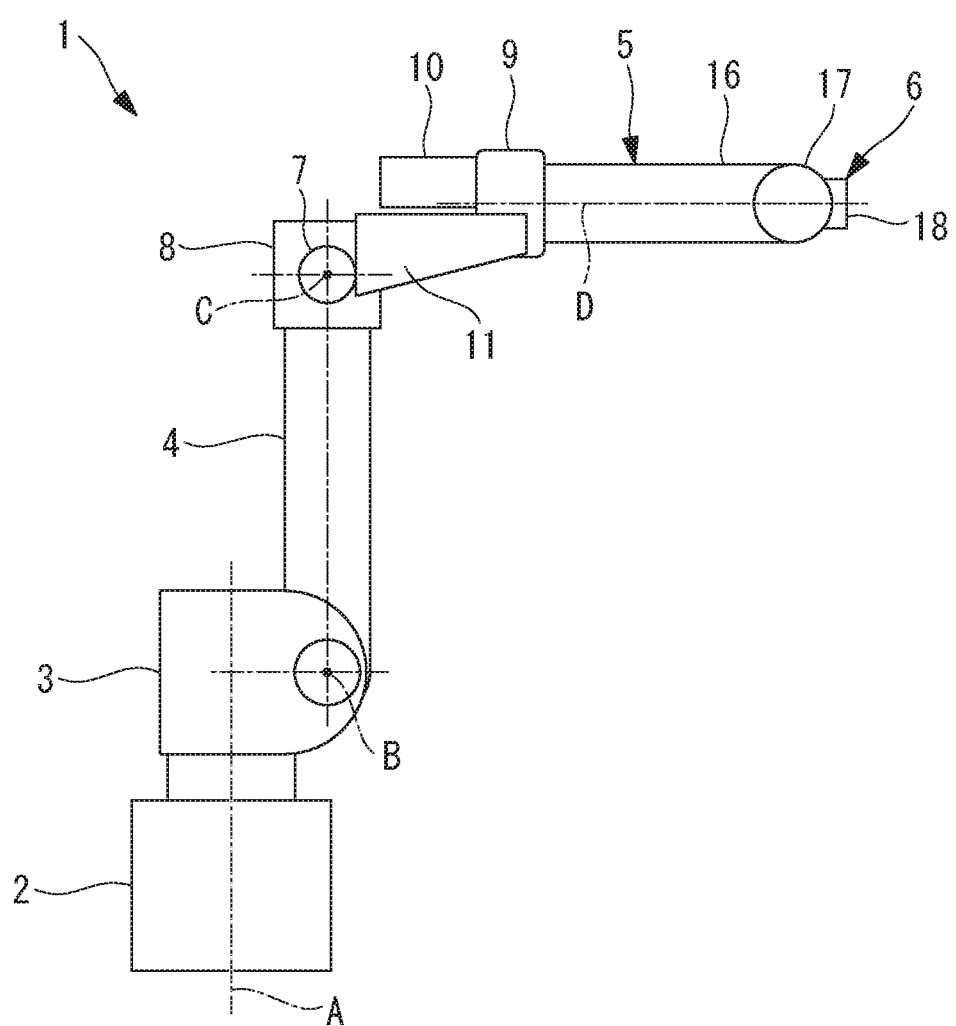
FIG. 2 is a side view schematically illustrating the overall configuration of the robot (long arm) in FIG. 1.

The securing members 11 may be of a short type shown in FIG. 1 or a long type shown in FIG. 2.

The long-type securing members 11 are formed such that the distance between the attachment position to the first bracket 8 and the attachment position to the second bracket 9 is larger than that of the short-type securing members 11.

More specifically, as shown in FIGS. 4 to 8, the securing members 11 are L-shaped flat plate members that secure the first bracket 8 and the second bracket 9 to each other in a detachable manner by being joined, by means of the bolts 12, to opposite side surfaces that horizontally flank the first bracket 8 and the second bracket 9 having the same width in the horizontal direction.

The operation of the robot 1 according to this embodiment having the above-described configuration will be described below.

Figure 4:
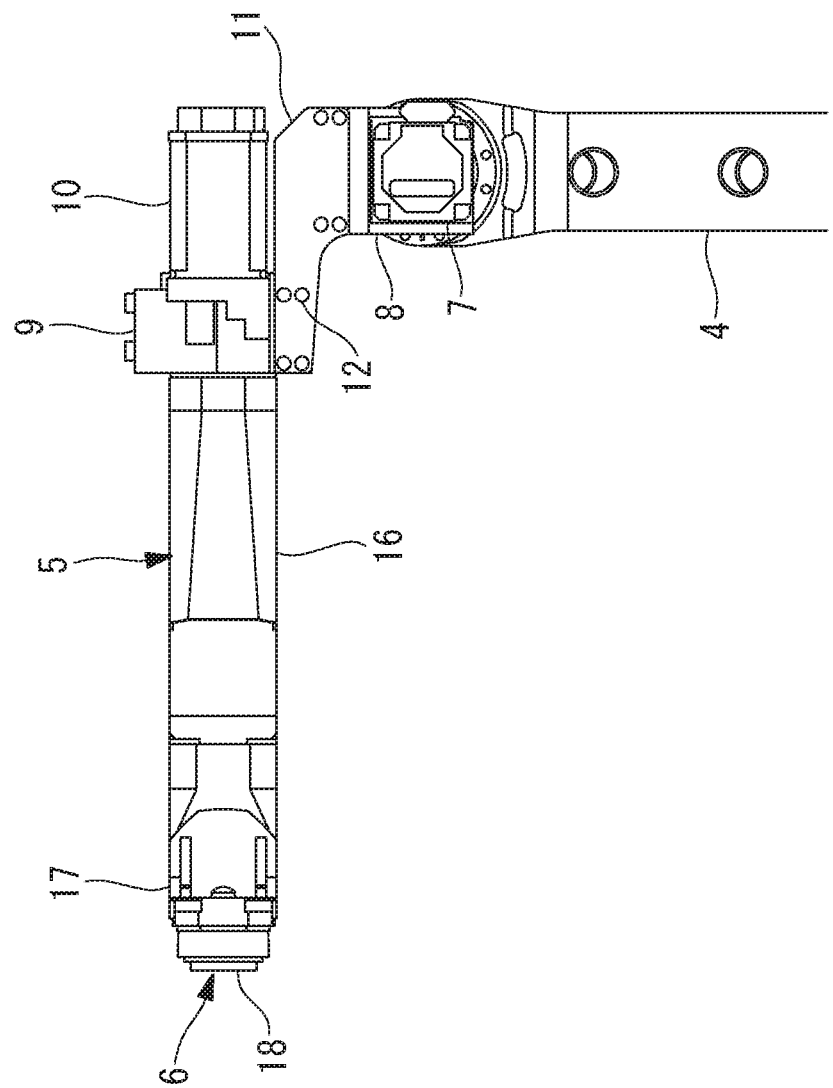
FIG. 4 is a partial side view of the robot in FIG. 1.
Figure 5:
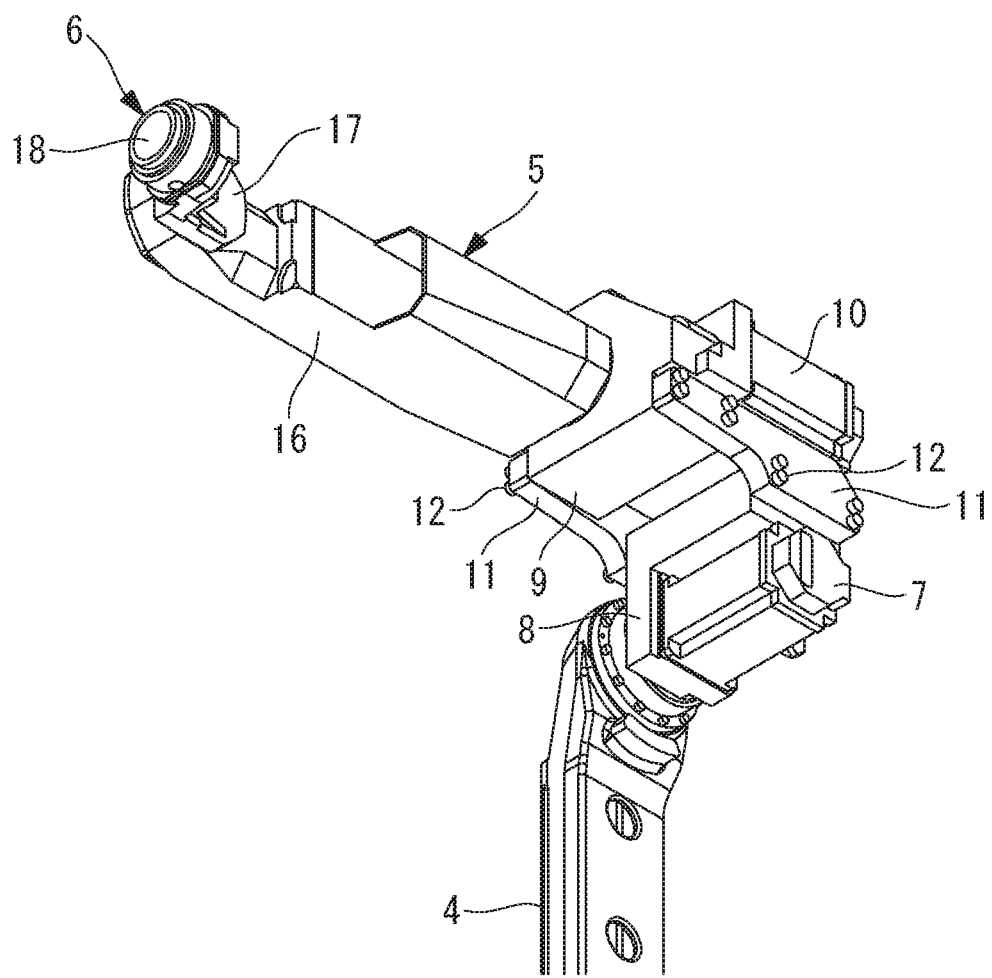
FIG. 5 is a perspective view of a second shaft unit of the robot in FIG. 1, as viewed at an angle from below.

As shown in FIGS. 4 and 5, in the robot 1 according to this embodiment, in a state where the opposite side surfaces of the first bracket 8 of the first shaft unit and the second bracket 9 of the second shaft unit in the horizontal direction are sandwiched between a pair of short-type securing members 11 and are secured by means of the bolts 12, the first bracket 8 and the second bracket 9 are joined together by the securing members 11, so that the entire second shaft unit can be swiveled about the third axis C relative to the first arm 4 by actuating the motor 7.

Figure 7:
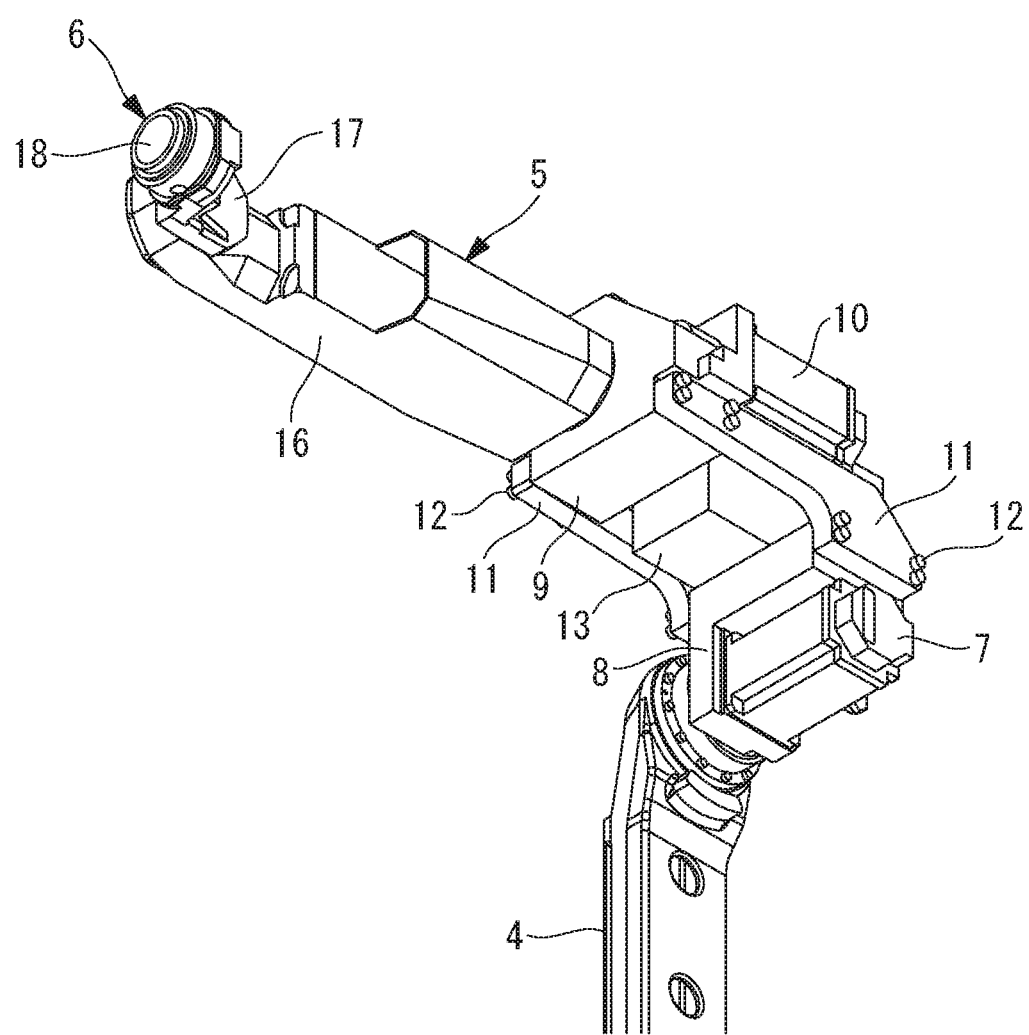
FIG. 7 is a perspective view of the second shaft unit of the robot in FIG. 2, as viewed at an angle from below.
Figure 8:
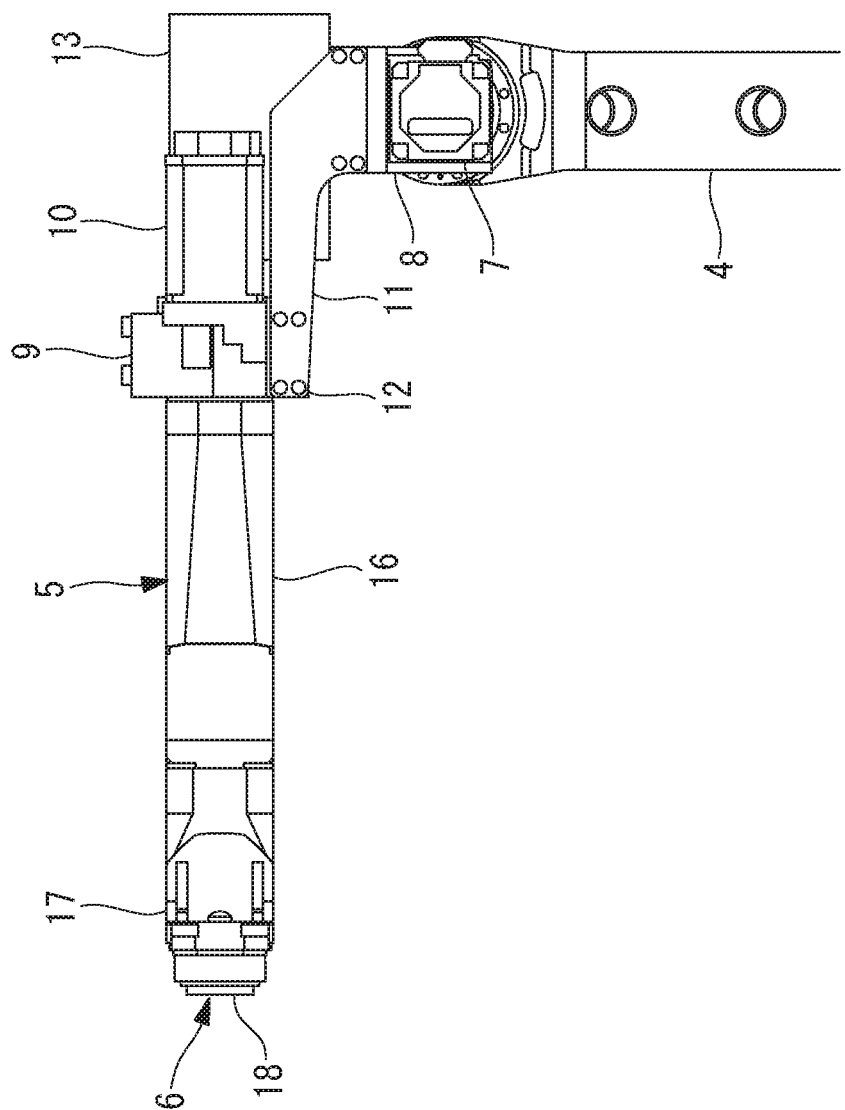
FIG. 8 is a partial side view of the robot in FIG. 2.

From this state, the securing members 11 are removed by loosening the bolts 12, as shown in FIG. 6, and are replaced with the long-type securing members 11, as shown in FIGS. 7 and 8. Then, the long-type securing members 11 are secured by means of the bolts 12, so that the entire second shaft unit can be shifted toward the distal end of the wrist 6.

Accordingly, the operating range can be changed to extend the maximum reachable position of the distal end of the wrist 6.

In this case, in the robot 1 according to this embodiment, the entire second shaft unit can be shifted forward without disassembling the second shaft unit for changing the operating range of the robot 1. Specifically, because the second shaft unit may have a movable cable extending toward the motor for driving the wrist 6 or may have a power transmission mechanism for transmitting power from the motor to the wrist 6, as in the related art, an assembly process and an adjustment process are necessary if the second shaft unit is to be disassembled, changed to another one with a different size, and assembled again.

If the operating range can be changed without disassembling the second shaft unit, as in this embodiment, the same components constituting the second shaft unit can be used before and after the changing of the operating range. Thus, the number of components can be reduced, and the time required for the adjustment process and the assembly process can be reduced, which is advantageous in that the cost can be significantly reduced. Furthermore, the use of flat plate members as the securing members 11 achieves easier machinability and is advantageous in that they can be manufactured at low cost. Moreover, in a case where a motor is disposed within the wrist 6, a motor driving cable (not shown) within the motor 10 and the second arm 5 may be given an extra length between the first arm 4 and the second shaft unit in view of the shifting amount of the second shaft unit, so that the same cable can be used.

In this embodiment, assuming that the up-down direction in the drawings is the vertical direction, the first bracket 8 and the second bracket 9 can be secured by the pair of securing members 11 disposed at positions where they flank the first bracket 8 and the second bracket 9 in the horizontal direction. This is advantageous in that the second shaft unit can be supported in a sandwiched state so that the rigidity can be increased.

Furthermore, as shown in FIGS. 7 and 8, by shifting the second shaft unit forward, space is formed between the two securing members 11. By using this space, for example, a wire feeder 13 for feeding a wire, such as a welding wire, can be disposed, so that the robot 1 can be used as an arc welding robot.

Figure 13:
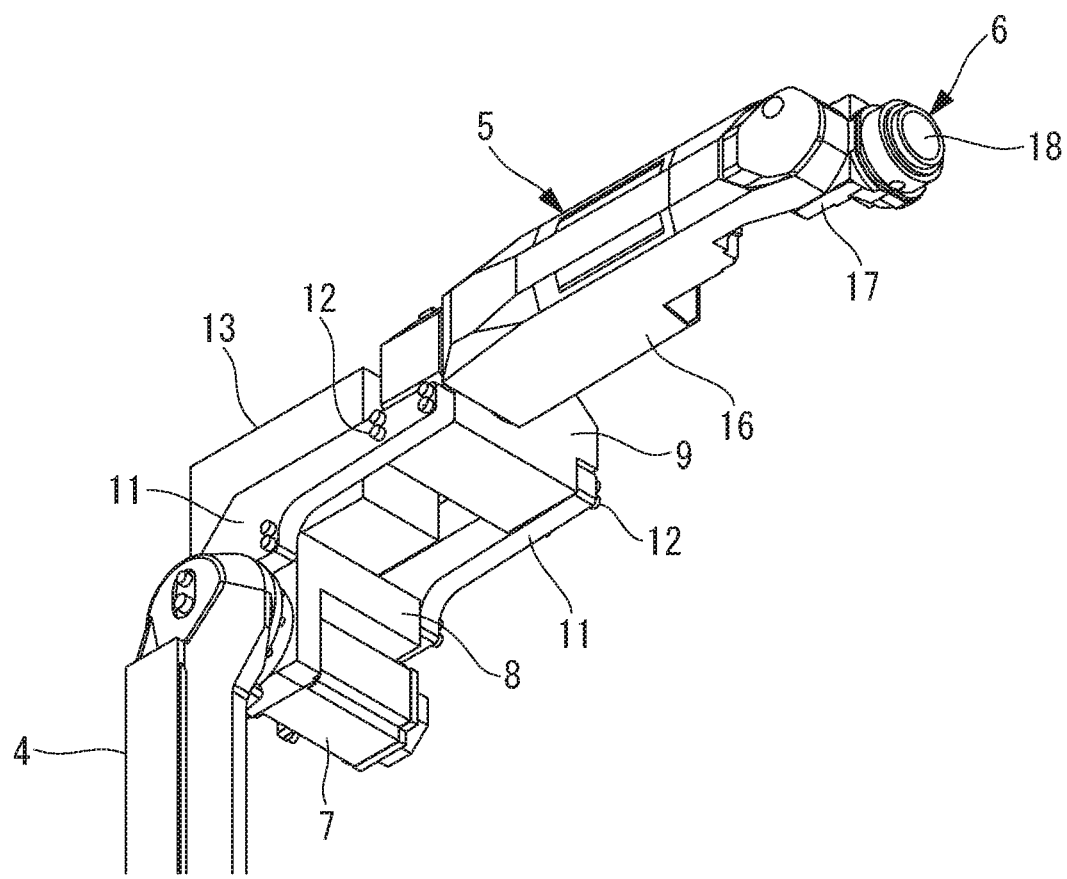
FIG. 13 is a partial perspective view illustrating an advantage of the robot in FIG. 1.
Figure 14:
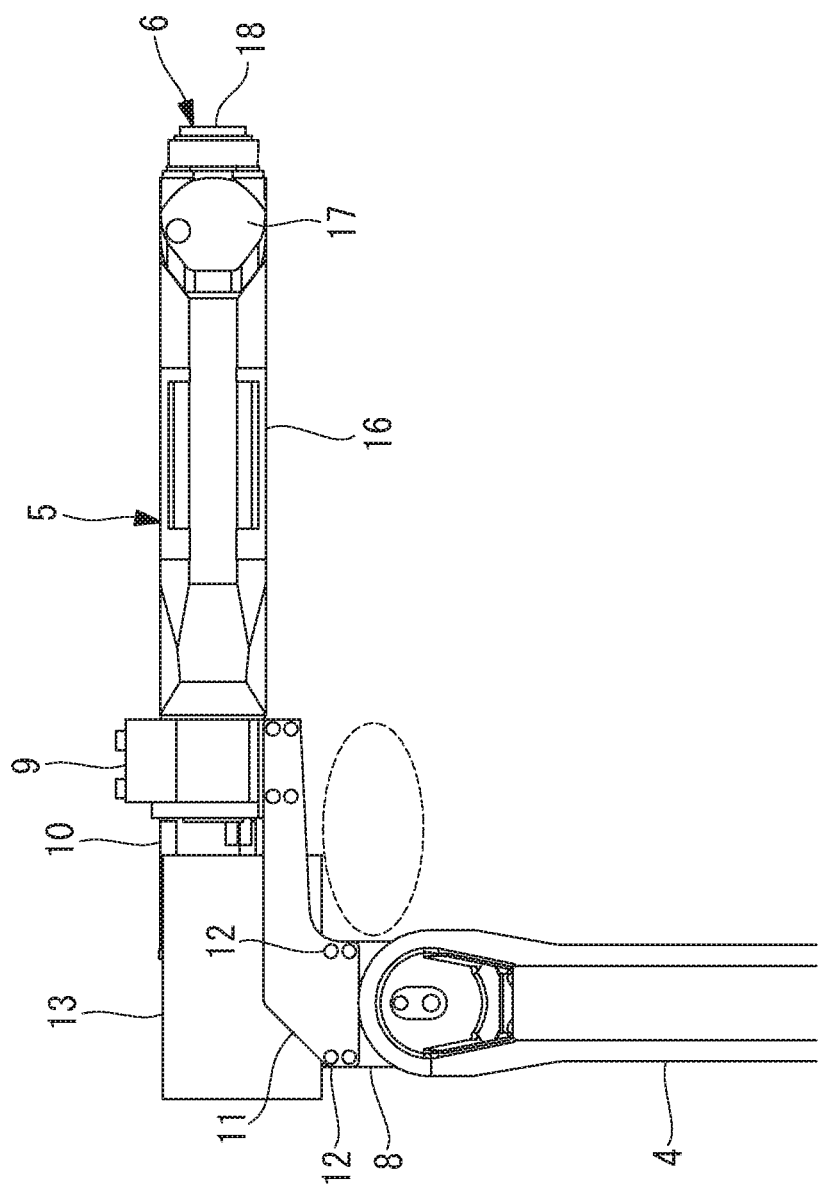
FIG. 14 is a partial side view illustrating the advantage in FIG. 13.

Furthermore, as shown in FIG. 13, in this embodiment, the securing members 11 formed of L-shaped flat plate members are disposed at the opposite side surfaces of the first bracket 8 and the second bracket 9 in the horizontal direction, so that the securing members 11 are prevented from protruding from below the base end of the second shaft unit toward a region surrounded by a dashed line in FIG. 14. This is advantageous in that interference with peripheral devices can be reduced.

As an alternative to this embodiment in which two types of securing members 11, namely, a short type and a long type, are used, three or more types of securing members 11 may be prepared such that the operating range is changeable in a stepwise fashion.

Figure 3:
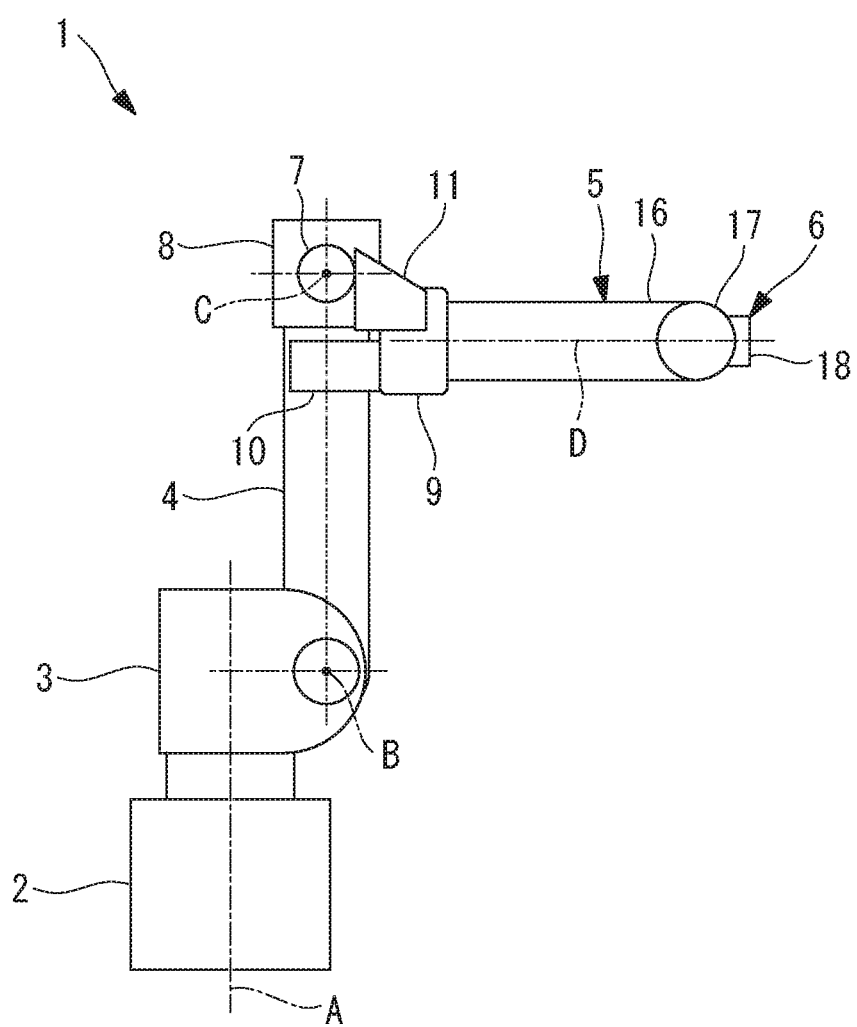
FIG. 3 is a side view schematically illustrating a shaft configuration in which a first shaft unit of the robot in FIG. 1 is inversely shifted in the vertical direction.
Figure 9:
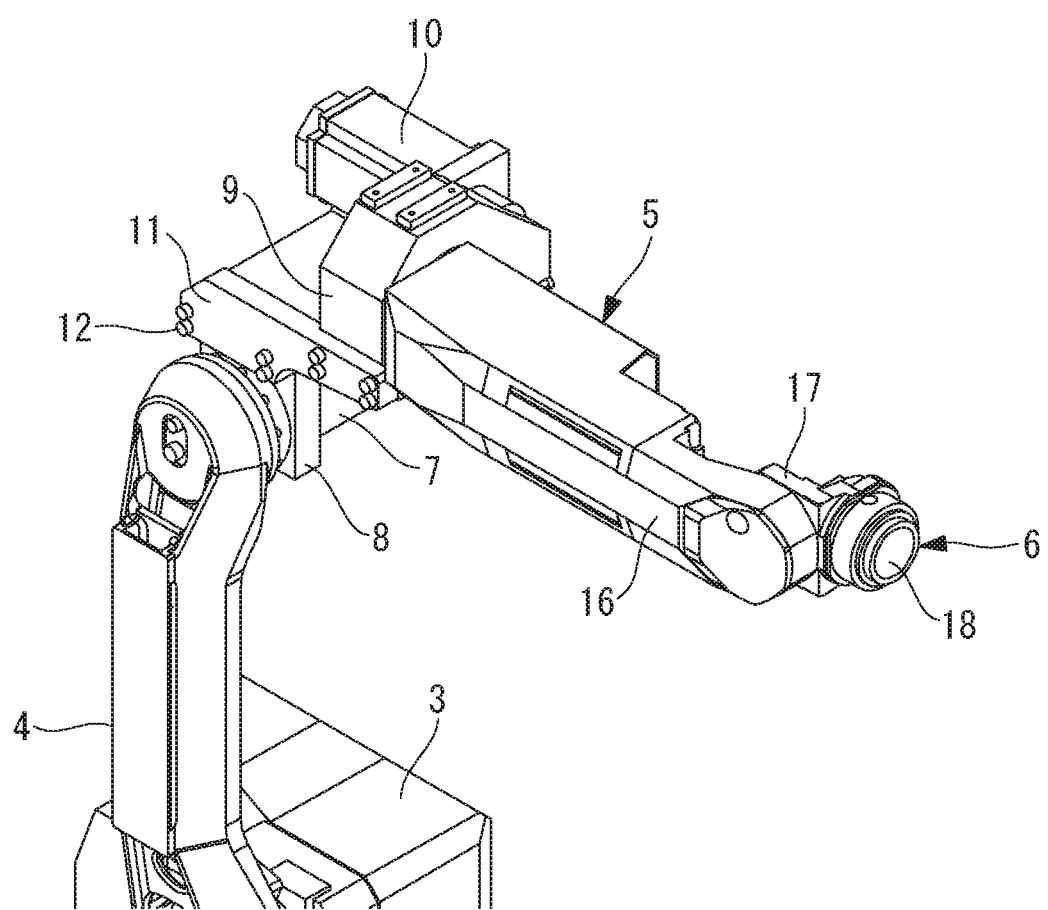
FIG. 9 is a partial perspective view of the robot in FIG. 1, as viewed at an angle from above.
Figure 10:
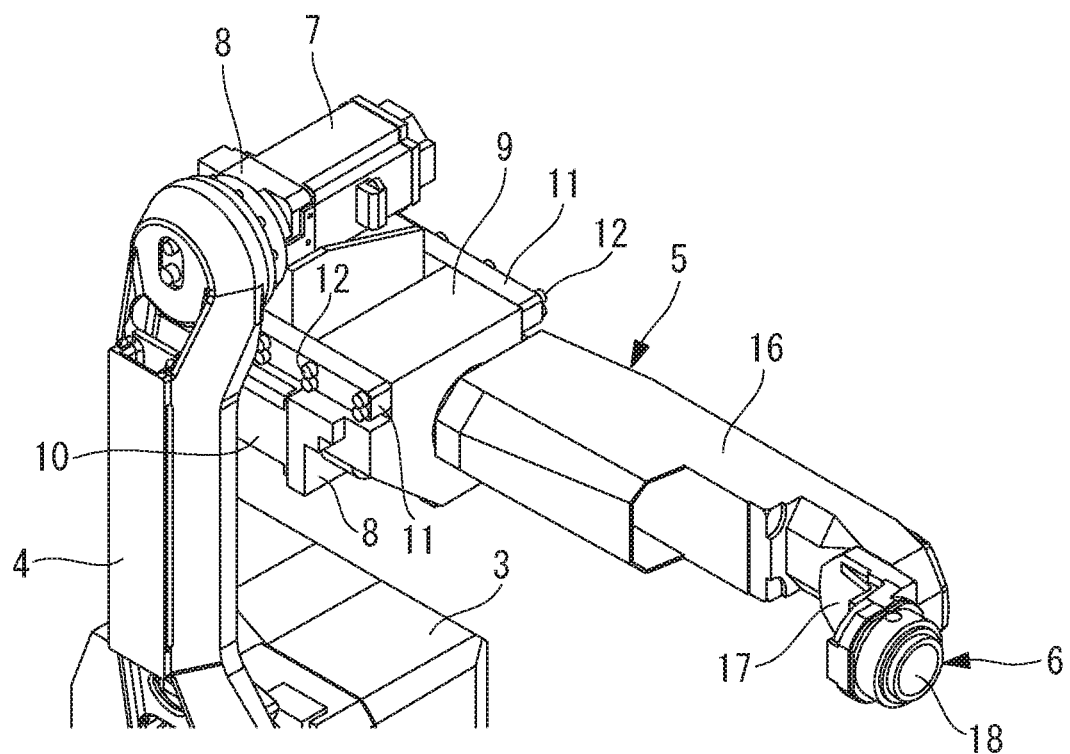
FIG. 10 is a partial perspective view of a robot obtained by vertically turning over the second shaft unit of the robot in FIG. 9 (and is also a partial perspective view of the second shaft unit of the robot in FIG. 3, as viewed at an angle from above).

Furthermore, since the securing members 11 are formed of flat plate members, the securing members 11 can also be used by turning over the front and rear sides thereof. For example, as shown in FIGS. 1 and 9, the second shaft unit disposed above the motor 7 that swivels the second arm 5 is vertically turned over, as shown in FIGS. 3 and 10, and the first bracket and the second bracket 9 are secured by means of the securing members 11 that have been horizontally inverted, so that a robot 1 having a shaft configuration in which the fourth axis is inversely offset in the vertical direction can be formed.

Figure 11:
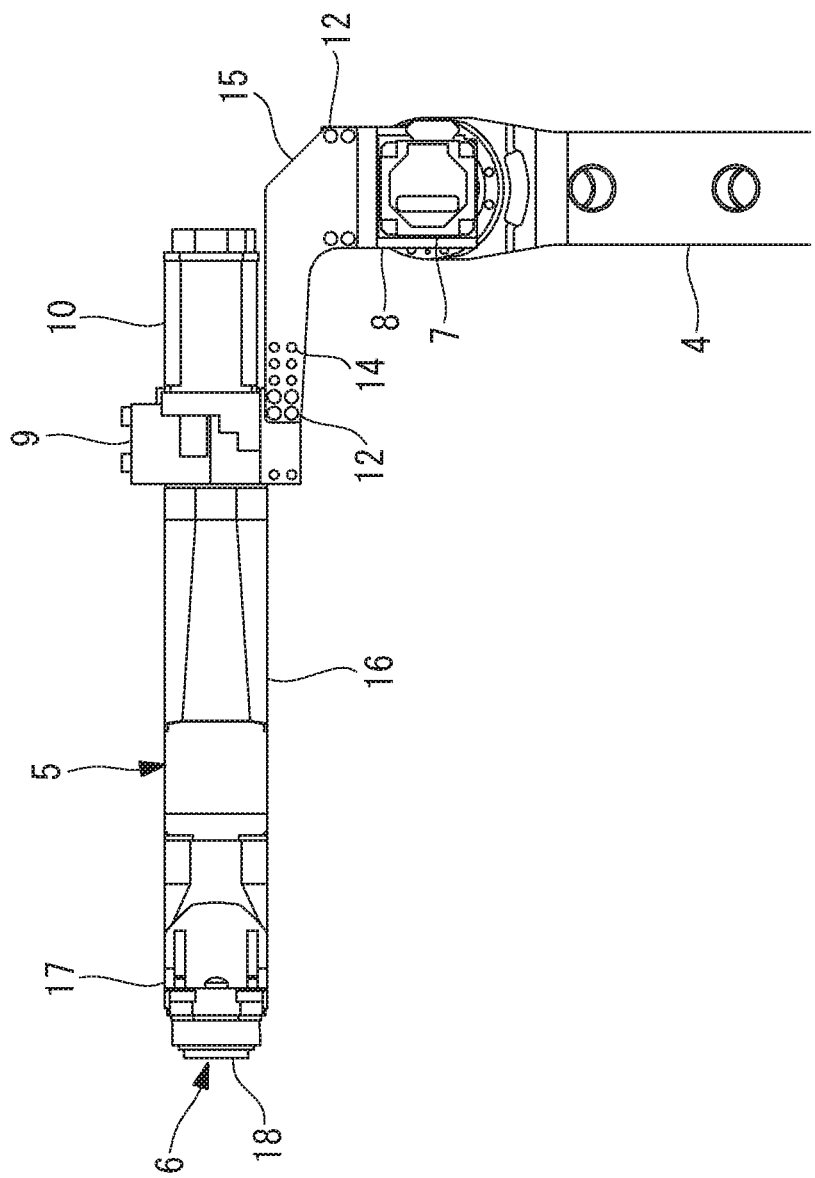
FIG. 11 is a partial side view illustrating a modification of the robot in FIG. 2.
Figure 12:
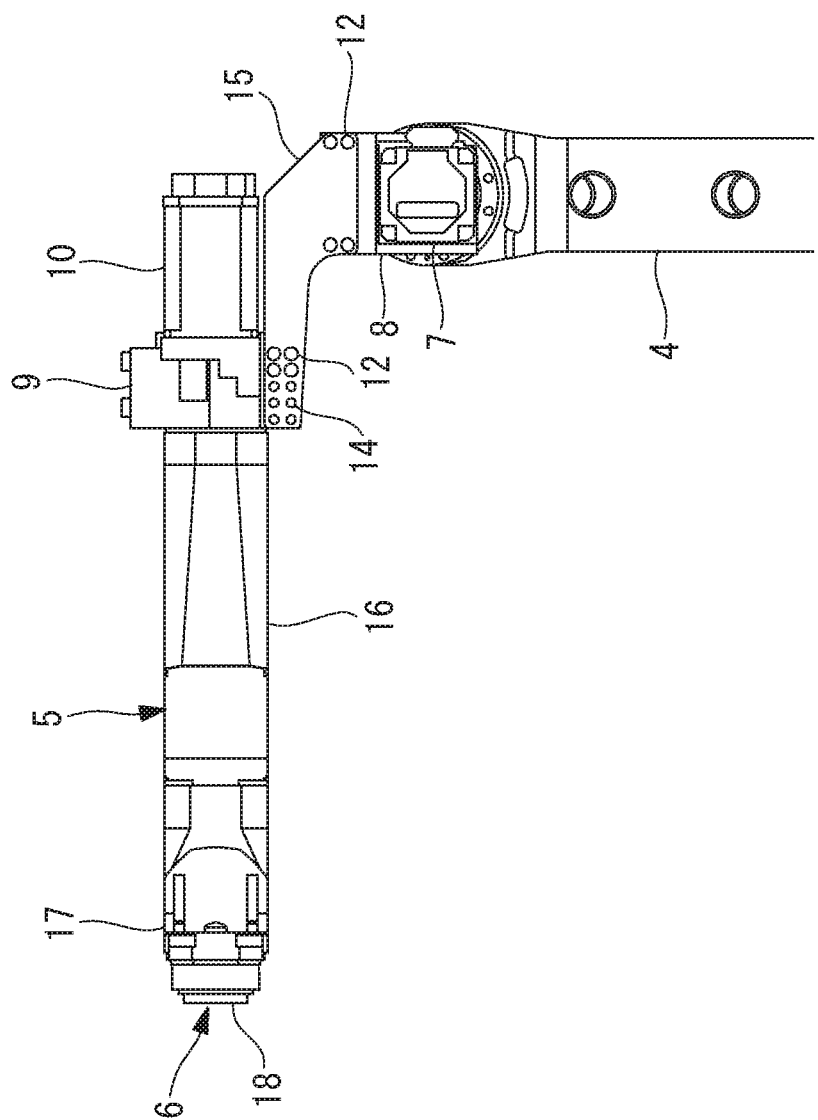
FIG. 12 is a partial side view illustrating a modification of the robot in FIG. 1.

Instead of changing the operating range by preparing and switching between two types of securing members 11, a single type of securing member 15 having a plurality of through holes may be prepared such that the securing position to the second bracket 9 is changeable in the front-rear direction, as shown in FIGS. 11 and 12.

As an alternative to or in addition to changing the securing position to the second bracket 9, the securing position to the first bracket 8 may also be changeable.

In the case where a plurality of securing positions are prepared for the single type of securing member 15, as shown in FIGS. 11 and 12, the securing member 15 may be integrated with the first bracket 8 or the second bracket 9.

This is advantageous in that the number of components can be further reduced and cost reduction can be achieved.

Figure 15:
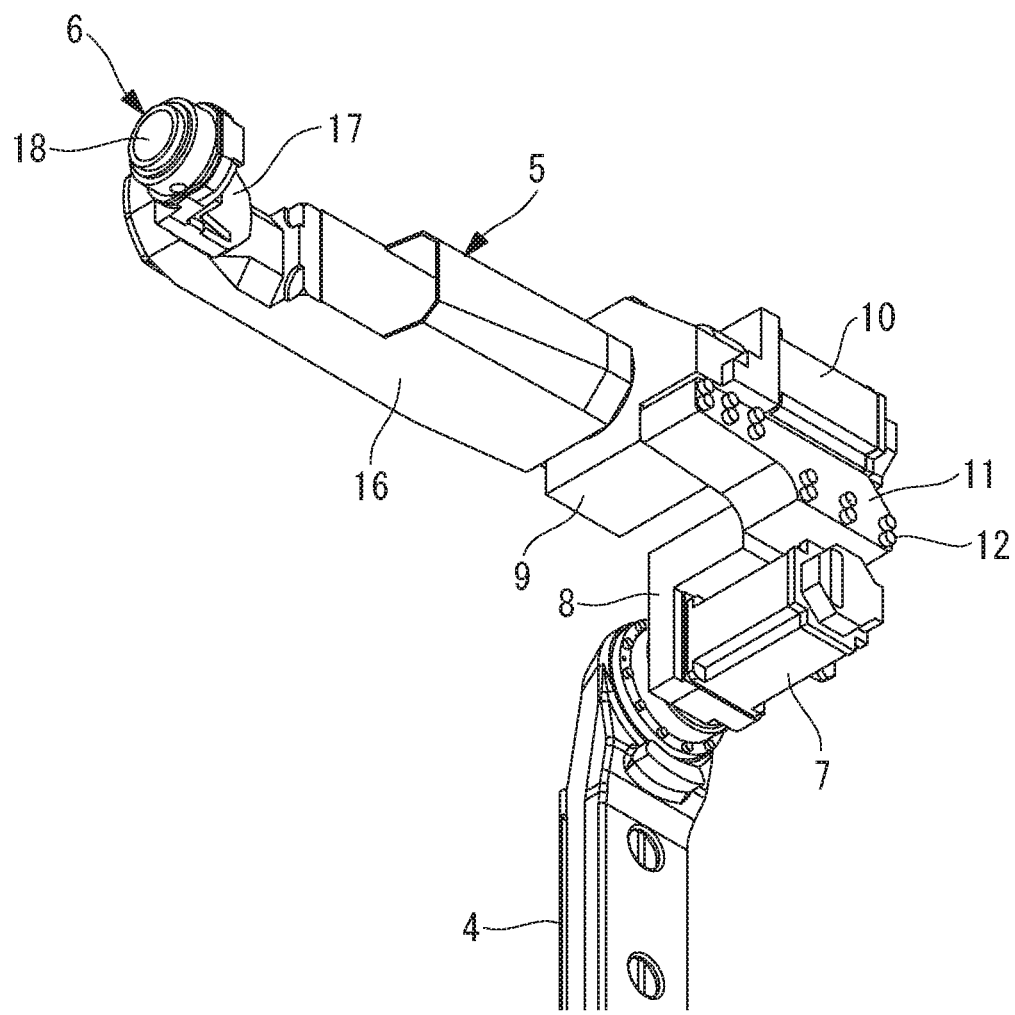
FIG. 15 is a partial perspective view illustrating another modification of the robot in FIG. 1.

Furthermore, in this embodiment, the second shaft unit is supported in a sandwiched state by securing the securing members 11 at the opposite side surfaces that horizontally flank the first bracket 8 and the second bracket 9. Alternatively, the second shaft unit may be supported in a cantilevered manner by disposing a securing member 11 at one of the side surfaces, as shown in FIG. 15.

As an alternative to the structure in this embodiment in which the second shaft unit is shiftable in the front-rear direction at the position where the second arm 5 is attached to the first arm 4, the embodiment may be applied to a case where the second axis about which the first arm 4 is swiveled relative to the rotating body 3 is shiftable in the front-rear direction or a case where the second shaft unit is shiftable in the longitudinal direction of the first arm 4.

As an alternative to the flat plate members used as the securing members 11 in this embodiment, the securing members used may have ribs for increasing the strength of the securing members 11. Moreover, three or more securing members 11 may be used for the securing.

Furthermore, as an alternative to the robot 1 according to this embodiment in which the fourth axis D extends within a plane orthogonal to the third axis C and in which the third axis C and the fourth axis D are disposed perpendicularly to each other, the third axis C and the fourth axis D may be disposed parallel to each other such that the plane orthogonal to the third axis C and the plane orthogonal to the fourth axis D are parallel to each other.

Figure 16:
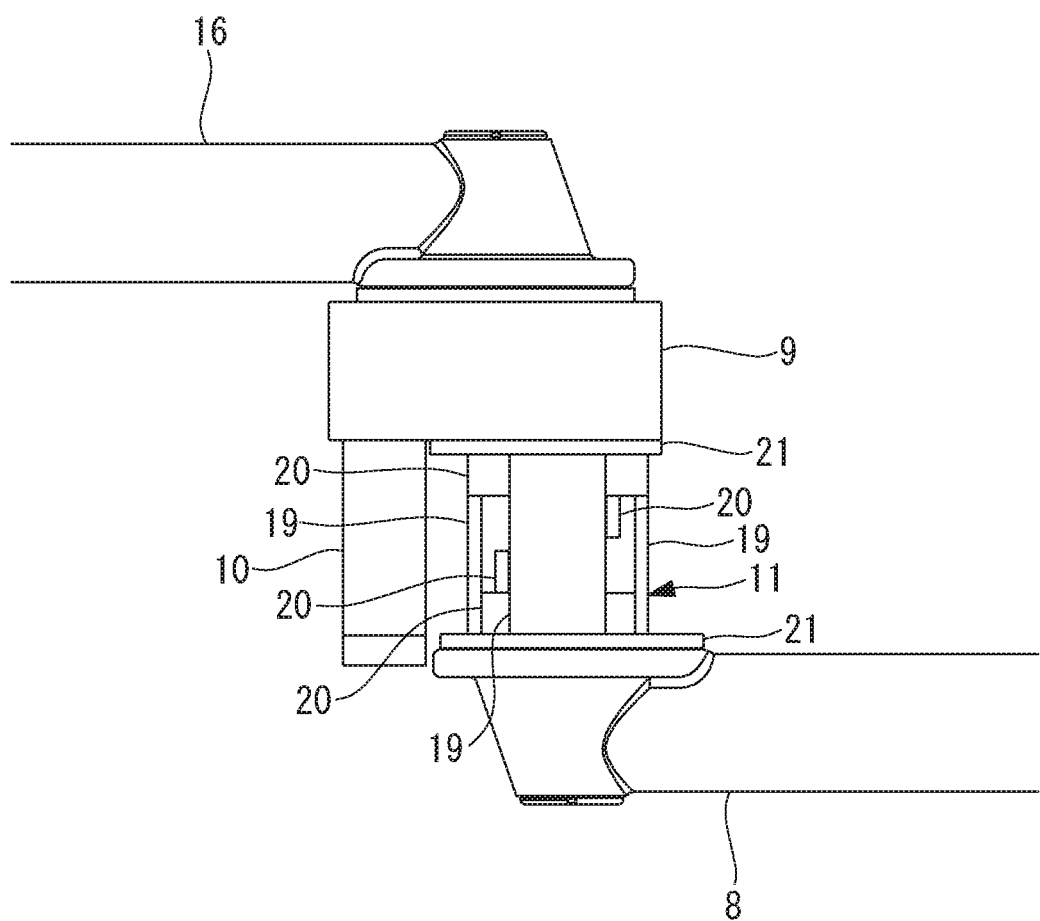
FIG. 16 is a partial side view illustrating another modification of the robot in FIG. 1.
Figure 17:
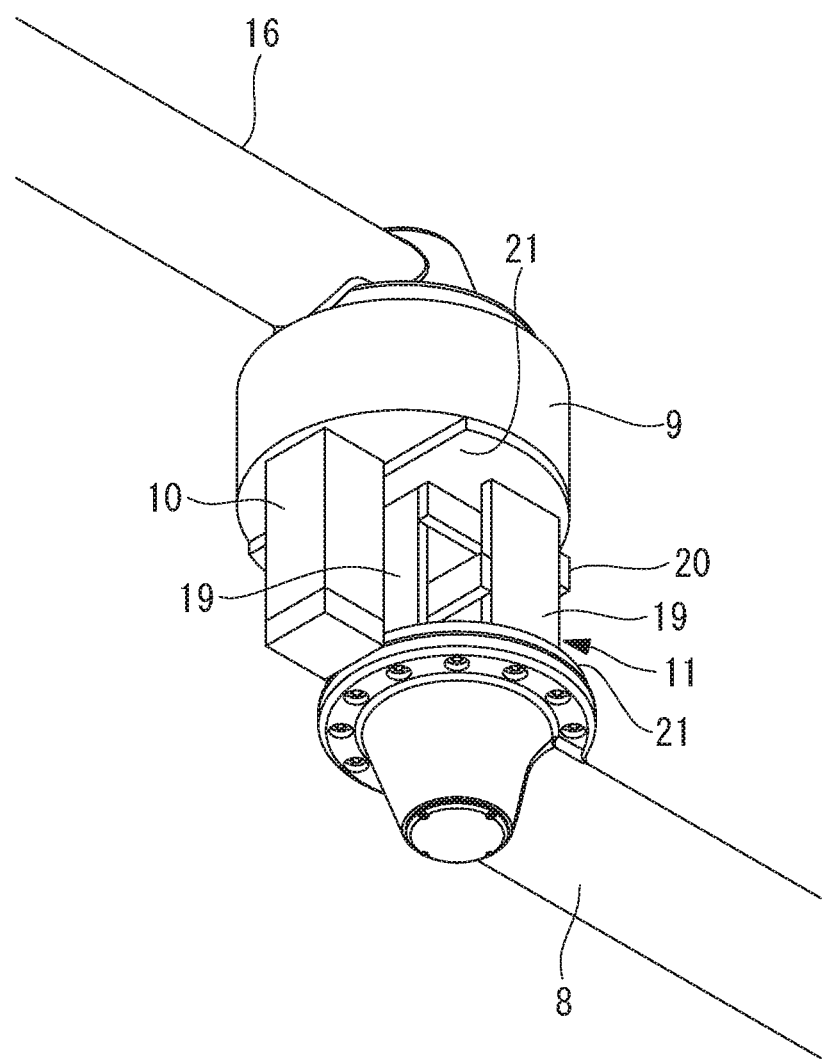
FIG. 17 is a partial perspective view of the robot in FIG. 16, as viewed from one direction.
Figure 18:
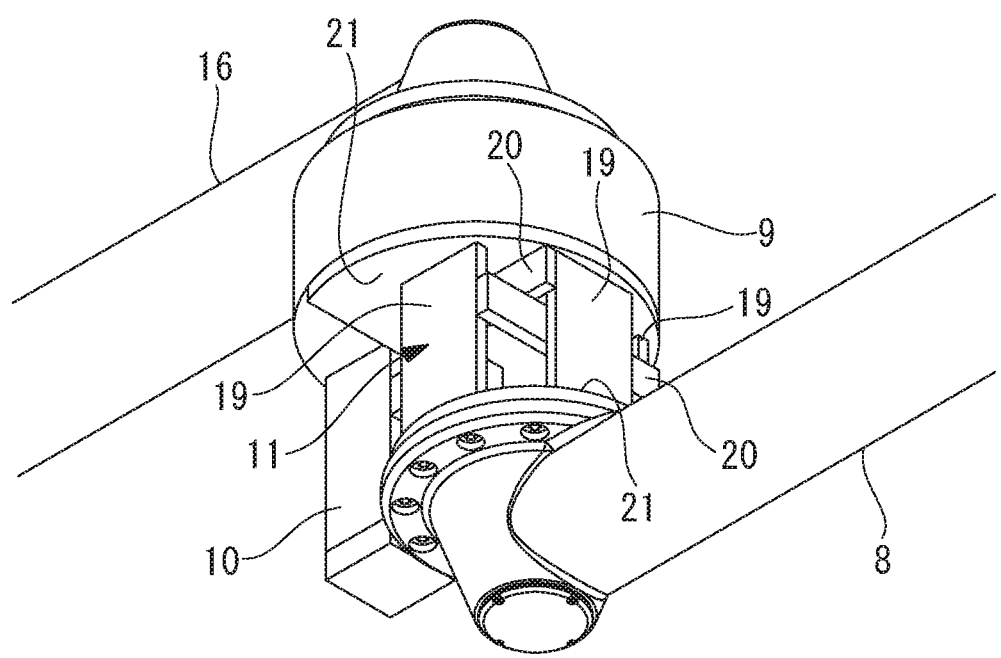
FIG. 18 is a partial perspective view of the robot in FIG. 16, as viewed from another direction.

Furthermore, as shown in FIGS. 16 to 18, in this embodiment, at least a part of a securing member 11 may be constituted of a group of a plurality of beam members 19 that connect the first bracket 8 and the second bracket 9 and a plurality of reinforcement members 20 that reinforce the plurality of beam members 19. Moreover, the beam members 19 and the reinforcement members 20 may have a plurality of holes and taps such that the attachment position is changeable. In this case, it is preferable that the group of beam members 19 and reinforcement members 20 be joined by means of bolts. Consequently, the securing member 11 can be reduced in weight and increased in strength, and can also be changed to another securing member 11 with a different offset amount in accordance with the intended usage of the robot 1 by simply replacing some of the beam members 19 and reinforcement members 20.

Furthermore, as shown in FIGS. 16 to 18, an intermediate member 21 for interconnecting two members may be provided at least between the first bracket 8 and the beam members 19 or between the beam members 19 and the second bracket 9. Thus, it is not necessary to remove the securing member 11 at an output shaft and to reduce the sealability of a driving unit, so that the attachment and detachment processes can be performed more readily.

Although a six-axis articulated robot is described as the shaft configuration of the robot 1 in this embodiment, the embodiment is not limited to this configuration.

For example, the embodiment is also applicable to a seven-axis articulated robot in which one additional rotational shaft is added to the first arm 4 in FIG. 1 in a direction in which the first arm 4 is twisted. The first arm 4 may be divided at an intermediate section thereof, and the divided segments of the first arm 4 may be used as securing members for a newly-added single shaft unit.

This allows the length of the first arm 4 to be adjustable, and also allows the number of axes to be changed to, for example, six axes or seven axes. This is not limited to a vertical articulated robot and is also applicable to a SCARA-type robot, which is a horizontal articulated robot, or a parallel link robot.

The first shaft unit and the second shaft unit may alternatively be linear drive shafts instead of rotational shafts.

For example, with reference to a robot mounted on a traveling shaft, an installation base of the robot 1 may be used as a robot base offset from a slider-unit installation surface of the traveling shaft, so that the operating range of the robot 1 can be expanded. In this case, the robot base may be used as a securing member 11, so that the offset amount becomes adjustable, whereby the operating range of the robot 1 becomes adjustable.

Figure 19:
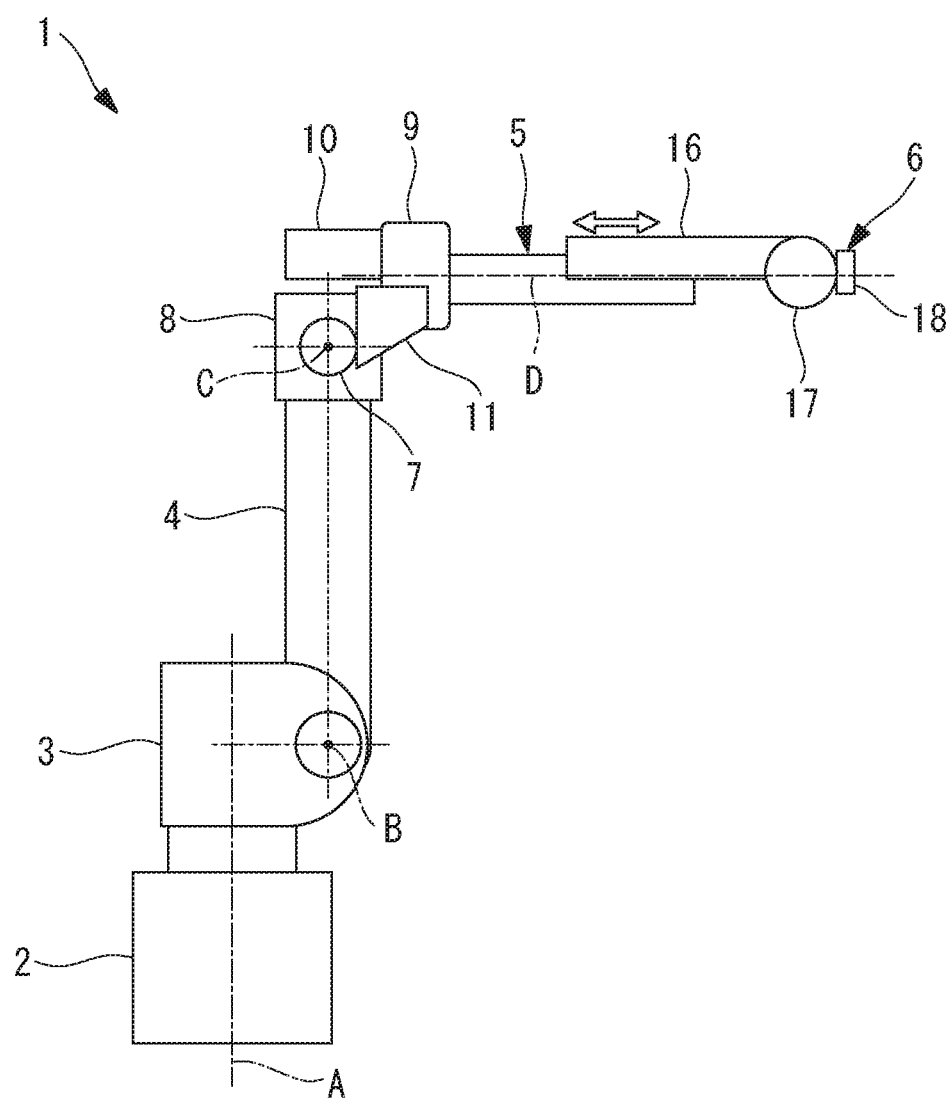
FIG. 19 is a side view schematically illustrating the overall configuration of another modification of the robot in FIG. 1.

In this embodiment, the first shaft unit is configured such that the first bracket 8 is rotatable about the third axis C relative to the first arm 4, and the second shaft unit is configured such that the base end shaft 16 is rotatable about the fourth axis D relative to the second bracket 9. Alternatively, the first shaft unit used may be configured such that the first bracket 8 is driven relative to the first arm 4, and the second shaft unit used may be configured such that the base end shaft 16 is driven relative to the second bracket 9. For example, the first shaft unit may be configured such that the first bracket 8 is linearly driven relative to the first arm 4 in a direction extending along the third axis C, and the second shaft unit may be configured such that the base end shaft 16 is linearly driven relative to the second bracket 9 in a direction extending along the fourth axis D. Moreover, as shown in FIG. 19, the first shaft unit used may be of a rotational drive type and the second shaft unit used may be of a linear drive type, or the first shaft unit used may be of a linear drive type and the second shaft unit used may be of a rotational drive type.

As a result, the above-described embodiment leads to the following aspect.

An aspect of the present invention provides a robot including: a first shaft unit in which a first motor drives a second member relative to a first member; a second shaft unit in which a second motor drives a fourth member relative to a third member; and a securing member that is provided in a detachable manner between the second member and the third member and that integrally secures the second member and the third member to each other.

According to this aspect, the third member of the second shaft unit is attached to the second member of the first shaft unit by using the securing member. Thus, the robot is configured to drive the second member and the third member relative to the first member by actuating the first motor, and to drive the fourth member relative to the second member and the third member by actuating the second motor. In this case, since the securing member is detachable between the second member and the third member, the securing member can be replaced with another one having a different length, whereby the operating range of the robot can be readily changed.

Specifically, the operating range can be changed by simply shifting the position of the second shaft unit relative to the first shaft unit by means of the securing member without disassembling the second shaft unit in which the second motor drives the fourth member relative to the third member. Consequently, this can reduce the number of components and allows for an easier joining process, so that the operation range can be changed at low cost.

In the above aspect, the robot may further include an intermediate member at least provided between the second member and the securing member or between the third member and the securing member so as to interconnect the two members.

Accordingly, the attachment and detachment processes of the securing member can be performed more readily at the intermediate member.

In the above aspect, the first shaft unit may be configured such that the second member is rotationally driven relative to the first member, and the second shaft unit may be configured such that the fourth member is rotationally driven relative to the third member.

Accordingly, a biaxial drive unit can be provided relatively easily.

In the above aspect, at least one of the first shaft unit and the second shaft unit may be linearly driven.

Accordingly, a part of the robot can be operated linearly.

In the above aspect, a rotational shaft of the fourth member relative to the third member may extend within a plane that is substantially orthogonal to a rotational shaft of the second member relative to the first member.

Accordingly, this can be applied to a robot in which two adjacent shafts are substantially orthogonal to each other.

In the above aspect, the securing member may be provided in a securable manner at different positions relative to at least one of the second member and the third member.

Accordingly, the same securing member can be used for securing the second member and the third member to each other, thereby further reducing the number of components and achieving cost reduction.

In the above aspect, the securing member may be integrated with one of the second member and the third member and may be provided in a securable manner at different positions relative to the other one of the second member and the third member.

Accordingly, one of the second member and the third member and the securing member are integrated with each other, thereby further reducing the number of components and achieving cost reduction.

In the above aspect, the securing member may be capable of securing the second member and the third member to each other at opposite sides that flank the second member and the third member.

Accordingly, the third member can be secured to the second member in accordance with a sandwiched structure, thereby achieving increased rigidity.

In the above aspect, the securing member may be formed of a flat plate member.

Accordingly, the securing member formed of a flat plate member can be manufactured readily at low cost, and by turning over the front and rear sides of the securing member, the first shaft unit and the second shaft unit can be connected in various modes.

In the above aspect, at least a part of the securing member may be constituted of a group of a plurality of beam members and at least one reinforcement member. The plurality of beam members may serve as reinforcements between the second member and the third member. The at least one reinforcement member may reinforce each beam member.

Accordingly, a lightweight securing member with sufficient strength can be provided.

In the above aspect, the group of the beam members or the reinforcement member may be joined by a bolt.

Accordingly, the securing member can be changed to another one with a different offset amount in accordance with the intended usage of the robot by simply replacing some of the beam members and the reinforcement member.

In the above aspect, the second shaft unit may include a third motor that rotationally drives a fifth member relative to the fourth member, and may also include a fourth motor that rotationally drives a sixth member relative to the fifth member. The fourth member, the fifth member, and the sixth member may constitute a wrist section.

Accordingly, the operating range can be changed by simply shifting the second shaft unit without disassembling the second shaft unit including the fourth member, the fifth member, and the sixth member, which constitute the wrist section, and also including the second motor, the third motor, and the fourth motor, which respectively drive these members. Consequently, this can further reduce the number of components and can also reduce the time required for the joining process, thereby achieving cost reduction.

The present invention is advantageous in that it can reduce the number of components and allows for an easier joining process, so that the operating range can be changed at low cost.

REFERENCE SIGNS LIST 1 robot
4 first arm (first member)
6 wrist (wrist section)
8 first bracket (second member)
9 second bracket (third member)
7, 10 motors (first motor, second motor)
11, 15 securing members
16 base end shaft (fourth member)
19 beam member
20 reinforcement member
21 intermediate member
C third axis (rotational shaft)
D fourth axis (rotational shaft)

The invention claimed is:

1. A robot comprising:
a first shaft unit in which a first motor drives a second member relative to a first member;
a second shaft unit in which a second motor drives a fourth member relative to a third member; and
a securing member that is provided in a detachable manner between the second member and the third member that secures the second member and the third member to each other,
wherein the securing member is configured to be secured at different positions relative to at least one of the second member and the third member,
a size of an operating range of a wrist section and an amount of offset between an axis of the first shaft unit and an axis of the second shaft unit are changeable by changing a securing position relative to the at least one of the second member and the third member,
the second shaft unit comprises a third motor that rotationally drives a fifth member relative to the fourth member, and a fourth motor that rotationally drives a sixth member relative to the fifth member, and
the fourth member, the fifth member, and the sixth member constitute the wrist section.

2. The robot according to claim 1, further comprising:
an intermediate member at least provided between the second member and the securing member or between the third member and the securing member so as to interconnect the two members.

3. The robot according to claim 1,
wherein the first shaft unit is configured such that the second member is rotationally driven relative to the first member, and
wherein the second shaft unit is configured such that the fourth member is rotationally driven relative to the third member.

4. The robot according to claim 1,
wherein at least one of the first shaft unit and the second shaft unit is linearly driven.

5. The robot according to claim 3,
wherein a rotational shaft of the fourth member relative to the third member extends within a plane that is orthogonal to a rotational shaft of the second member relative to the first member.

6. The robot according to claim 1,
wherein the securing member is integrated with one of the second member and the third member and is provided in a securable manner at different positions relative to the other one of the second member and the third member.

7. The robot according to claim 1,
wherein the securing member secures the second member and the third member to each other at opposite sides that flank the second member and the third member.

8. The robot according to claim 1,
wherein the securing member is formed of a flat plate member.

9. The robot according to claim 1,
wherein at least a part of the securing member comprises a beam part and at least one reinforcement part, the beam part serving as reinforcements between the second member and the third member, the at least one reinforcement part reinforcing the beam part, and
the beam part and the at least one reinforcement part are joined to each other by a bolt.

10. A method for changing an operating range of a robot comprising a first shaft unit in which a first motor drives a second member relative to a first member; a second shaft unit in which a second motor drives a fourth member relative to a third member; and a securing member that is provided in a detachable manner between the second member and the third member and that integrally secures the second member and the third member to each other, the second shaft unit comprising a third motor that rotationally drives a fifth member relative to the fourth member, and a fourth motor that rotationally drives a sixth member relative to the fifth member, the fourth member, the fifth member, and the sixth member constituting the wrist section, the method including:
  switching the securing member that secures the second member and the third member to another securing member having a different length or a different shape to be able to change a size of the operating range of a wrist section comprising the fourth member and an amount of offset between an axis of the first shaft unit and an axis of the second shaft unit.

11. The robot according to claim 9, wherein the beam part and the at least one reinforcement part have a plurality of holes and taps, such that an attachment position of the securing member is changeable.

12. The robot according to claim 9, wherein an intermediate member is provided for interconnecting between the second member and the beam part or between the beam part and the third member.

* * * * *